Figure 1:
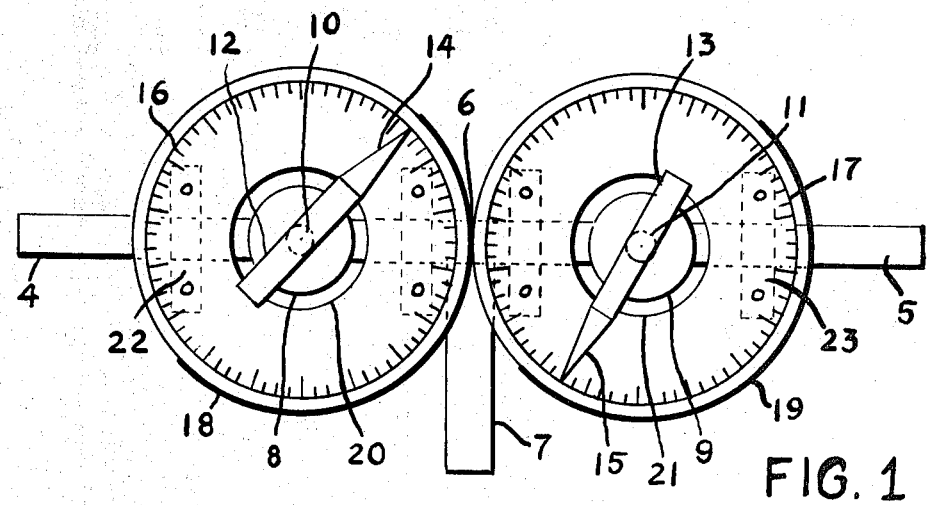

United States Patent

[11] 3,542,042

[72] Inventor Werner W. Buechner
 4407 Gladding Court, Midland, Michigan 48640
[21] Appl. No. 707,757
[22] Filed Feb. 23, 1968
[45] Patented Nov. 24, 1970

[54] WATER MIXING DEVICE AND METHOD FOR DELIVERING A STREAM OF TEMPERATURE CONTROLLED WATER
 6 Claims, 2 Drawing Figs.
[52] U.S. Cl..................................................... 137/1, 137/551, 137/556.3
[51] Int. Cl.......................................................F16k 31/50, F16k 37/00
[50] Field of Search........................................... 137/551, 555, 556.3, 556.6, 556, 1

[56] References Cited
UNITED STATES PATENTS

| | | | |
|---|---|---|---|
| 1,800,314 | 4/1931 | Noftzger et al. | 137/556.3X |
| 1,808,092 | 6/1931 | Wimmer | 137/551 |
| 2,010,201 | 8/1935 | Ruttiman | 137/556.6 |
| 2,247,090 | 6/1941 | Jones et al. | 137/556.6 |
| 2,529,605 | 11/1950 | Gustafson | 137/556.6 |
| 3,085,592 | 4/1963 | Zajac et al. | 137/556 |
| 2,830,618 | 4/1958 | Mitchell | 137/606X |
| 2,991,481 | 7/1961 | Book | 137/606UX |

Primary Examiner—Henry T. Klinksiek
Attorney—Werner W. Buechner

ABSTRACT: Device for mixing streaming hot and cold water in exact proportions for producing a stream of water having an exact, predetermined intermediate temperature, which device comprises means for metering one of the streams of incoming water and a valve for metering and varying the flow rate of the second stream of water and scale means and correlated indicating means for adjustment of the flow rate through said variable valve to a predetermined value.

Patented Nov. 24, 1970

3,542,042

INVENTOR.
Werner W. Brechner

WATER MIXING DEVICE AND METHOD FOR DELIVERING A STREAM OF TEMPERATURE CONTROLLED WATER

The present invention relates to a method and device for producing a stream of water of controlled temperature by mixing a cold and a hot stream of water at the exact proportions required for achieving a desired delivery temperature. More specifically, the invention relates to new device and method for providing a stream of water having a predetermined temperature for controlling the temperature in photographic wet treating equipment and for washing photographic material at a controlled temperature.

For many purposes, especially for photographic color development by the amateur in his home, where only limited hot water supply is available, there is a need for a water mixing device, which is inexpensive, accurate, economical in water consumption and which is particularly designed to overcome the difficulties and limitations of the commercially available mixing valves and devices.

It is therefore an object of the present invention to provide a new method for mixing streaming hot and cold water, and for the exact adjustment of the relative flow rates of the separate incoming streams of water so as to provide a flowing stream of water of an exact, predetermined temperature, which method may be practiced without special skill and patience.

It is another object of the invention to provide a new mixing valve comprising at least one independently variable valve, in which the amount of necessary adjustment of at least one of the valves can be predetermined and calculated on the basis of the temperature differential to be corrected or compensated for in the outgoing stream of water.

Figure 2:
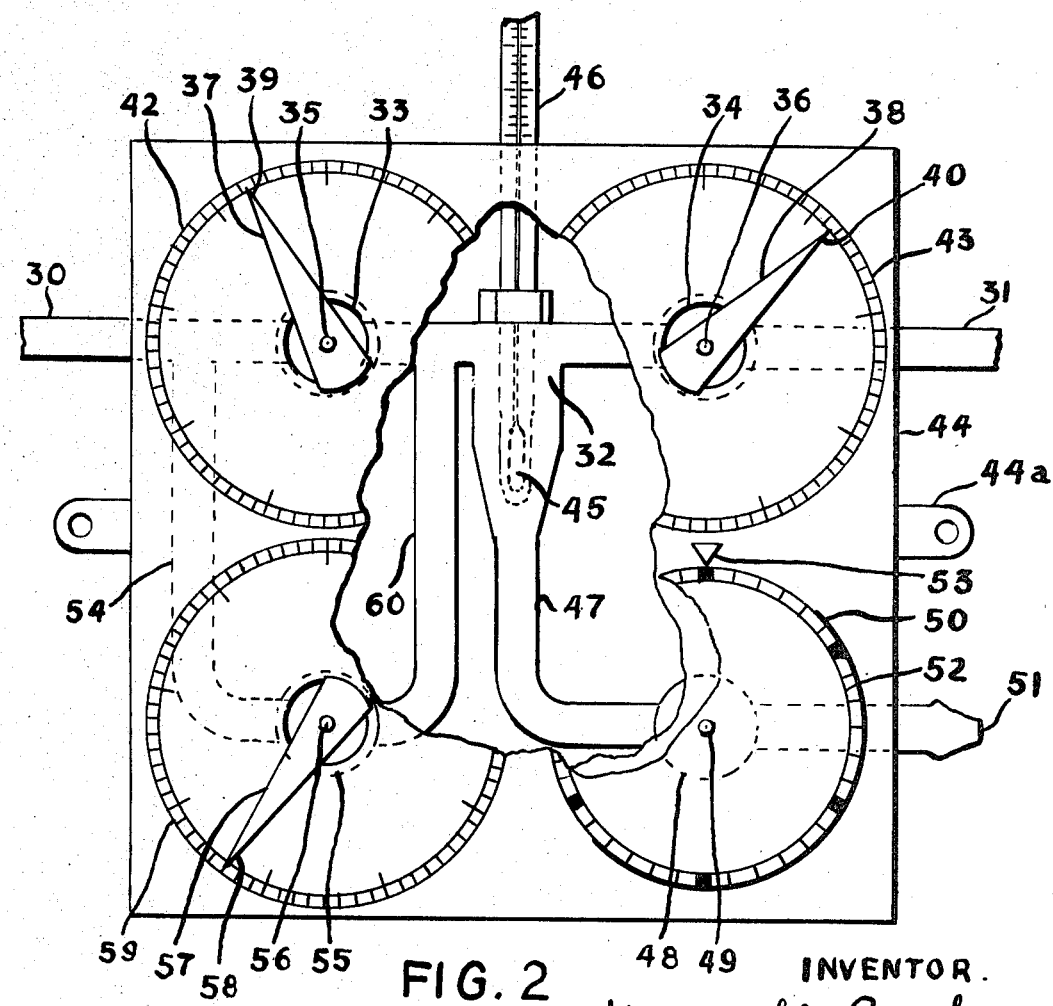

In the attached drawings, FIG. 1 is a top elevation of a two-valve mixing device of the present invention. FIG. 2 illustrates a top elevation, partially broken away, of a modified mixing device of the invention which comprises in addition a bypass valve and a shutoff valve.

The invention is based on a device which comprises at least one needle valve and preferably two needle valves, which valves are adapted to increase or decrease the flow rate of the water, streaming through them, by rotation of the stem, preferably continuously and preferably in proportion to the angle of turn of the stem. These types of valves are well known and there is a great variety of different embodiments of these valves commercially available. Preferred are those valves in which the difference between the fully closed and fully opened positions requires a plurality, and preferably a very large number (e.g. eight or ten or more) full turns of the stem. The most preferred valves are those, in which the rotation of the stem by a given angle produces a change of the flow rate by a constant factor. This ideal situation is most closely approached in the so-called fine adjustment needle valves, e.g. needle valves requiring a very large number of full turns to change them from the fully opened to the fully closed position.

The invention is predicated on the concept that a desired change of the temperature of the emanating mixed stream of water requires, depending on the relative temperatures of the hot and cold water streams, a definite change in the flow rate of one of the streams of water. With a continuously or nearly continuously operating valve, a given change of the flow rate of the water streaming therethrough requires a definite angle of turn of the stem. Since in most locations the temperatures of the hot and cold water change from day to day and from place to place, it is not possible to provide the valves with markings or scales or the like, in which certain rotational positions of the stems are coordinated to certain flow rates and thus to certain temperatures of the emanating mixed stream of water. Since, however, the temperature of the cold water supply, if taken from the ground or from underground piping, and the temperature of the hot water, if taken from a large water supply, e.g. a tank heater such as the electric or gas operated household tank heaters, is constant or essentially constant at least for an operating session of reasonable length of time, the flow rate coordinated to a certain rotary stem position can be utilized for controlling the temperature in the outgoing mixed water stream with great accuracy, by adjusting the stem position of one of the valves in accordance with a relative scale or gradation system as will be explained and set out hereinafter in detail in connection with the preferred embodiments of the device of the invention. The terms "hot" and "cold" water are used herein merely relatively speaking, i.e. the cold water is the colder stream and the hot water is the warmer incoming stream.

Accordingly, the invention concerns a water mixing device, which permits the mixing of at least two metered streams of water of different temperature, in which at least one of the streams is metered by an adjustable valve, having a rotatable stem and coordinated to said stem indicating means for indicating the relative rotational positions of said stem for positive control of the flow rate of the water passing through said valve in relation to the measured temperature of the emanating mixed stream of water.

Referring now to FIG. 1, the device comprises an inlet tube 4 for hot water, an inlet tube 5 for cold water, both being communicatively connected at T-junction 6 and continuing in outlet tube 7 for the stream of mixed hot and cold water. In each of the tubes 4 and 5 is provided a valve, of the continuously variable type or of the fine adjustment needle type valve. Each valve comprises the valve body 8 and 9, respectively, and rotary stem 10 and 11, respectively. The interior valve mechanism may be of conventional type as available in good commercial valves or it may be specially designed to give as closely as possible, a continuous variation of the flow rate of the water passing through the valve, proportional to the rotary position or rotation of the stem. On stems 10 and 11 are provided handles 12 and 13 for rotation of the stem and for the operation of the valve. On one end of each of handles 12 and 13 is provided pointer 14 and 15, respectively, its outer pointed end being close to and cooperating with circular scale 16 and 17, respectively. The scale is subdivided or graduated in small units by radial short lines and by longer radial lines dividing the subdivisions into groups. Scales 16 and 17 are provided on discs 18 and 19, respectively, which have a circular central opening 20 and 21, respectively, to fit over the valve body 8 and 9, respectively. The discs are mounted on tubes 4 and 5, respectively, by help of brackets or clamps 22 and 23.

For the operation of the just described mixing device, the hot water tube 4 is connected, e.g. by a T-tube connection into the household hot water line and the cold water tube 5 likewise into the cold water line. Handles 12 and 13 are then adjusted to provide about the desired flow rate of the emanating mixed stream of water at about the desired temperature, say within ± 5°F. or 3°F. or so of the desired exact temperature. As soon as the household lines have been flushed from the stagnant water and the valves have assumed approximately the temperature of the supply of hot and cold water respectively, the temperature of the mixed outgoing water stream, measured e.g. by a thermometer at the exit of outlet tube 7, will assume an approximately constant value $x$ degrees, which is the desired temperature A plus or minus $y$ degrees, $y$ being the deviation from the desired temperature A. At this point the operator changes the rotary position of one of the valve stems 10 or 11, respectively, e.g. in the case $x$ is higher than A, he decreases the flow of the hot water or increases the flow of the cold water and vice versa, if $x$ is lower than A he decreases the flow of the cold water or increases the flow rate of the hot water. This first change of the flow rate of the water passing through one of the valves is arbitrary and in approximation. The operator notes the number of divisions and the direction, by which he changes the rotational position of the stem as indicated by pointer 14 or 15, respectively on the coordinated scale and observes the temperature change achieved by this change of the rotational position of the stem. He may then calculate and note the number of divisions corresponding to one degree or one-tenth degree, or so, change of the temperature of the outgoing mixed water stream, or if desired, the number degrees or usually the fraction of a degree of the temperature change corresponding to one or a certain plurality, e.g. four, eight, ten or the like of the divisions. This relation may be noted and can be used on that day for any further adjustment and readjustment of the temperature of the outgoing mixed stream of water, if and when this should become necessary. In this manner it is possible to readily achieve, by positive adjustment or direct dialing, respectively, a temperature of the outgoing stream of water within 0.1°F. or better, if this is desired, every time an adjustment is made. After the initial determination of the dialing factor, one single positive setting of the handle and pointer is merely required for accurate temperature control. Tedious, arbitrary turning back and forth of the handle with constant observing of the temperature changes or the usual trial and error adjustment are no more necessary with the device of the invention. No skill or practice is required for the operation of the device of the invention. Even without any experience, the operator simply shifts the pointer or other indicating means by the calculated number of divisions to the right or left to adjust the temperature exactly to the predetermined or desired level or point. This convenience and extreme accuracy cannot be achieved with any of the known manual temperature control devices for mixing two streams of water, and exceeds in some respects even the accuracy of the so-called automatic temperature control devices available at much higher prices and being subject to all kinds of limitations as very high minimum flow rates etc.

If good quality valves are used in the device of the present invention, the device has a tendency to hold the temperature of the outgoing mixed stream of water very well over long periods within a few tenths of a degree, resetting becoming necessary generally only in case the cold water or the hot water changes its temperature. These changes, which may amount to one-half or 1°F. or so over one-half hour or over longer periods, are in most locations and in many houses generally slow and relatively uniform. By occasionally checking the temperature of the outcoming mixed water stream and by advancing or adjusting one or the other valve, as may becoming necessary, in accordance with the just described procedure by the required number of divisions on the scale, the temperature of the outcoming water may be kept constant or essentially constant or essentially constant within a narrow range for long operating periods. The device is generally insensitive to changes or fluctuations of the pressure in the main water supply. If only one of the two supply lines is subject to frequent or long lasting pressure variations, e.g. by the consumption of large amounts of hot or of cold water elsewhere in the house, it is recommended to connect both the hot and cold water tubes 4 and 5 to the supply lines over a suitable pressure equalizing device such as the Tempera automatic pressure compensating valve of the Tempera Corporation in Portland, Oregon. Of course, a small change of the temperature of the hot or cold water supply during a working day, e.g. by one or a few degrees, which can be readily compensated for adjusting the device of the invention in the above described manner, does not sufficiently change the adjustment angle of the stem of the valve calculated in the above described manner to effect the accuracy of the device.

The just described valve may be modified in many ways. The arrangement of the valves and of the inlet and outlet tubing may be changed depending on the positions of the supply lines and the desired position of the outlet in relation thereto. Outlet tube 7 may be provided with a closeable valve, which permits closing and opening of the mixing device, or if desired varying of the flow rate of the mixed stream of water in wide limits without a need for readjustment of the hot and cold water metering valves. If desired a thermometer and other temperature indicating means may be mounted such that its temperature sensitive part is projecting into the path of the outgoing stream of mixed water.

A water mixing device of the invention, comprising some of these modifications and some additional features is illustrated in FIG. 2. The device comprises as before an inlet tube 30 for hot water and an inlet tube 31 for cold water, which both are communicatively connected into mixing chamber 32. In each of tubes 30 and 31 is provided continuously variable valve 33 and 34 respectively, having rotatable stems 35 and 36, respectively. Upon the projecting upper ends of stems 35 and 36 are set handles 37 and 38, respectively having one end extended to form pointers 39 and 40, respectively, which cooperate with circular scales 42 and 43, respectively provided on the top plate of housing 44, in which the valves 33 and 34, the mixing chamber 32 and part of tubes 30 and 31 are enclosed. The housing 44 is provided with ears or brackets 44a for mounting to the wall or to other suitable support. The arrangement and operation of this part of the device described so far, is very similar to that described in connection with FIG. 1 before. Into the mixing chamber 32 is set the reservoir 45 of thermometer 46, for indicating the temperature of the mixed stream of water passing through and leaving the mixing chamber through outlet tube 47. In the lower vertical leg of outlet tube 47 is provided shutoff valve 48, having rotary stem 49, onto which is set hand wheel or disc 50 for rotation of stem 49 and for adjustment of the flow rate of the stream of mixed water of the desired temperature leaving the device at outlet opening 51. Hand wheel 50 is provided at its outer edge with circular scale 51, provided with subdivisions in the manner described hereinbefore, cooperating with pointer 53, set fixedly on the top of housing 44. The scale means and pointer may be used in similar fashion as described above for the control of the flow rate of the outgoing mixed water stream, which can be effected without disturbing the setting of the hot and cold water valves 33 and 34. Of course, valve 48 may also be a simple on-off valve, if fine control of the outgoing mixed stream is not desired.

At the left, U-shaped tube 54 is communicatively connected by its ends to hot water inlet tube 30, so that it bypasses valve 33. In the lower horizontal leg of U-tube 54 is provided valve 55, comprising as before stem 56, handle 57 with integrated pointer 58, the latter cooperating with circular scale 59. The additional valve 55 may be used to periodically change the temperature of the outgoing stream to a higher level, without the need for disturbing the relative settings of valves 33 and 34. By opening the valve 55 a certain degree, the water emanating at 51 will change from a temperature A to a higher temperature B, depending on the angle of turn of stem 56. If temperature B is to be set accurately to a definite level, the scale means 59 may be used as described before for adjusting the flow rate through valve 55 for an approximate value and by a precalculated turn of stem 56 to the position which produces the exact desired temperature B in the outgoing water. If desired, an adjuvant shutoff valve, being operated in fully closed and in fully open positions only, may be provided in the right leg of U-tube 54 at 60 or at any other convenient location in the bypass tube. Merely opening and closing of this valve, with valve 55 being preset and left undisturbed, will permit to change the temperature of the outgoing water from temperature A to temperature B and back to A, etc. as often as is desired.

If a temperature C, being lower than temperature B is desired, a U-tube and valve arrangement, as just described, may be communicatively connected into cold water tube 31, forming a bypass as described, if desired with an adjuvant shutoff valve as just mentioned.

In any of these arrangements, the temperature of the outgoing water is determined by taking readings at thermometer 46. Instead of using a stem thermometer as shown, a dial thermometer of sufficient accuracy or other suitable temperature indicating means may be used. The mixing chamber 32 may have any desired shape conducive to quick and thorough mixing of the cold and hot water streams passing into and through it. Fins, e.g. of the helical type or other devices and additions, well known in the hydrodynamic arts may be added or provided on the interior wall of the chamber for increasing the mixing efficiency. The valves and tubes etc. may be fastened in the housing in any desired manner. It was found, that localizing them by pouring a self-setting, bonding insulating resin, such as polyurethane foam into the space surrounding these members in the housing, provides additional economy in the manufacture and by its insulating qualities still better temperature constancy.

The provision of two variable valves, one each for the incoming hot water and cold water, has the advantage, that one may utilize for the adjustment of the temperature of the outgoing water that valve which meters the stream of water having the higher relative flow rate. This expedient provides the benefit of greater accuracy and of greater flexibility of the device regarding the range of temperatures which can be produced.

As stated before, the device of the invention operates best, if it is provided with precision valves, preferably with fine adjustment needle valves for the control of the streams of incoming hot and cold water and a quick set needle valve for the outgoing mixed stream of water. A device of the invention, being fitted in this manner, permits operation at low flow rates, e.g. of as low as one-tenth of a quart per minute or less to several quarts per minute, yet permitting highest accuracy in the temperature control and constancy of the outgoing water within limits of as close as up to 0.1°F. or better. Any deviation of the temperature of the outgoing mixed stream can be quickly and accurately corrected. The device can be shut off and reopened without any need for additional adjustment of the temperature. This all operates to make the device of the invention particularly suitable for use in the temperature control and washing in photographic wet treating processes of color materials, especially in the apparatus described in my U.S. Pat. Nos. 3,236,649 and 3,349,686 and similar apparatus, requiring for maximum temperature control and washing efficiency only small flow rates of the temperature controlled water. As stated above, with conventional equipment, the capacity of the average home hot water heater is not great enough to permit color developing sessions for the amateur of any reasonable length of time. Generally, at the low flow rates required by the device of the present invention, the regeneration of the hot water heater by the heat source (gas or electricity) is usually at least as fast as the consumption of hot water, so that an average home tank water heater is sufficient to supply all the hot water for operating the device over many hours, and if desired, for a whole day of uninterrupted service, without exhausting the supply of hot water.

The scales for the control of the setting of the hot and cold water valves have been shown hereinbefore as being stationary and the pointer means as being rotatable with the stem of the valves. If desired, the scales or other graduated indicating means may be rotatable with the stem and the pointer stationary, as shown e.g. in connection with shutoff valve 48 in FIG. 2. Any other suitable arrangement may be used for indicating the rotational positions of the valve stems relative to the preceding position and any other desired arrangement of the stem and scale means in relation thereto is acceptable.

The device can be inexpensively built from commercially available parts and valves and fulfills the need for an accurate low cost temperature controlling device, which is particularly suited to supply a stream of temperature controlled water of moderate flow rate. In addition to the new device, the present invention provides also a new method for the production of a stream of water of a predetermined temperature, which method comprises the step of metering a stream of hot water and a stream of cold water in such ratios, that the water, after mixing the two streams has about the predetermined temperature, whereby at least one of said streams is metered through variable valve means having a rotatable stem for adjusting the flow rate of the water passing through said variable valve means, the step of mixing the two streams of metered water and the step of varying the rotational position of said stem by a small increment, determining the temperature change brought about by said measured variation of the rotational position of said stem, calculating therefrom the angle and direction of change of the rotational position of said stem required for adjusting the temperature to the exact predetermined value, and the step of varying the position of said stem by said calculated angle. If desired, more than two streams of water may be mixed, whereby at least one of the streams is, in any case metered by a variable valve, while the others may also be metered by variable valves or by flow reducing means of fixed characteristics.

The foregoing discussion shows, that the device and the method of the invention permit to simply and correctly dial the desired or predetermined exact temperature of the outgoing stream of water, even though the temperature of the incoming hot and cold water streams may vary from day to day and from location to location and no fixed temperature settings per se can be marked on the scale or dial of the device. This is an unexpected result and makes the device and method more useful and superior to the devices commercially available for the same purpose.

EXAMPLE 1

An apparatus as illustrated in FIG. 1 was connected, as described hereinbefore, into the hot and cold water lines of a household water supply having an electrically heated 40 gallon tank water heater. Both valves were fully opened. After a few minutes, the valves had assumed about the temperature of the hot and cold water supplies and the valves were now adjusted to deliver at the outlet tube a mixed stream of water of about 68°F. After a few more minutes, the temperature of the outgoing water stream remained constant at 69.7°F. The handle of the cold water valve at the right was then turned counterclockwise to increase the flow rate of the cold water slightly, so that the pointer was displaced by 12 divisions. The new reading of the temperature of the outgoing mixed stream of water was determined to be 68.3°F. Therefrom it was calculated, that at the given flow rate one division of the cold water valve corresponded to a change of slightly more than 0.1°F. of the outgoing water. Resetting the cold water valve counterclockwise by three more divisions resulted in a temperature of about 68.0°F. of the outgoing water.

There was, on continuously running the water at that temperature, a slight shift of the temperature, which upon adjustment, at intervals of about 10 to 15 minutes, of the cold water valve by one or two divisions of the scale could be easily corrected, so that the outgoing stream of water maintained its temperature readily in a range of about ± 0.2°F. of 68°F. for many hours. More frequent readings and readjustments of the cold water valve by about one division per 0.1°F. change of the temperature permitted to maintain the temperature within a range of ± 0.1°F. of 68°F. The flow rate of the water was about 0.7 gallon per minute. The water was used for the temperature control and for the washing in the development of Agfa CN 14 negative film.

EXAMPLE 2

A device similar to that illustrated in FIG. 2 of the drawings and comprising three fine adjustment needle valves and a quick adjustment control valve for the mixed stream was permanently connected into the household water system described in example 1.

The upper hot and cold water valves were fully opened and the water run, for replacement of the stagnant water in the lines, until the outcoming water stream assumed an essentially constant temperature. The upper hot and cold water valves were then adjusted to produce a mixed stream of about 85°F., and by fine adjustment using the scale and division expedient as described in example 1, to produce a temperature of exactly 86.0°F. in the outgoing mixed stream.

The auxiliary hot water valve (lower left in FIG. 1) was then opened to increase the temperature of the outgoing mixed stream to about 100°F., and by fine adjustment in the manner described in example 1 using the scale and pointer, to exactly 103.0°F., which was filled into the compartments of a color sheet developing apparatus as described in my copending application Ser. No. 678,987 to bring the treating solutions surrounded by it from room temperature to a temperature of about 85°F. The auxiliary hot water valve was then closed, whereupon the outgoing mixed water stream assumed again its temperature of 86°F. This water was now used to bring the temperature in the first developer from 84.5°F. to exactly 85.0°F. by the method described in my said application Ser. No. 678,987. The treating solutions and developer in the apparatus were those prepared from Kodak Ektaprint C Chemicals and were used for the development of prints on Kodak Ektacolor Professional Paper. The water stream of 86.0°F. was then used, at a flow rate of about 1 quart per minute, flowing in countercurrent direction, for the control of the temperature in the remaining chemical solutions to a temperature of 85°F. ± 2° and for the intermediary and final washing of the prints in the manner described in my above said application Ser. No. 678,987. No further temperature adjustment was necessary during the development of each batch of paper. After a total processing time of more than 4 hours, the hot water supply was still not exhausted.

EXAMPLE 3

The device of example 2 was adjusted in the manner described in example 1, to provide a stream of mixed water having a temperature in the range of 100°F. ± 0.2°. The water was used for the temperature control and for the washing of the prints made in a Kodak Rapid Color Processor machine using the CP-5 process solutions. Occasional temperature readings were taken and the temperature readjusted to the above said range by resetting the hot water valve at the left by the number of divisions calculated from the observed temperature deviation to hole the temperature within ± 0.2°F. of 100°F. during the whole developing session.

The flow rate of the outgoing water was intermittently adjusted by operation of the quick set flow control valve (at the lower right in FIG. 2) between two fixed settings on the scale, which corresponded to flow rates of 1 qt./min. and 3 qt./min., with the lower flow rate used for temperature control between washing steps and the higher flow rate used for washing. More then three times as many prints could be processed before exhaustion of the hot water supply than was possible with the use of a commercial thermostatically controlled water mixing device. The exact control of the temperature in the critical developing stage resulted in prints of high, consistent and reproducible quality as they cannot be obtained with the use of the standard household water mixing valves for temperature control.

In exceptional situations, particularly where the uniformity of operating conditions permit, the above said indicating means may be provided with at least one or preferably with a plurality of different scales indicating absolute temperature values of the outgoing mixed stream of water corresponding to a given, definite rotational change of the stem position. However, as will be appreciated from the foregoing, the assembly of the invention, which comprises indicating means graduated or subdivided in relative divisions is generally preferred because of its greater versatility and independence of the constancy of the operating conditions such as temperature of the incoming streams of water, pressure, absolute flow rates etc.

I claim:

1. A valve assembly for the provision of a stream of water of a predetermined temperature, which assembly comprises separate inlet conduit means for streaming hot and cold water, chamber means for mixing the hot and cold streams of water communicatively connected to each of said separate inlet conduit means, outlet conduit means for the mixed streaming water communicatively connected to said chamber means, and metering means provided in said separate inlet conduit means for controlling the flow rates of said separate streams of hot and cold water passing through said inlet conduit means, at least one of said metering means being a fine adjustment needle valve having a rotary stem and means for rotation of said stem by hand, for adjustment of the temperature of the mixed stream of water, wherein at least one of the variable metering means comprises index indicia cooperative with said stem and extending in a full circle, said indicia being relative for the indication of the relative angular rotational position of the stem of said needle valve but not indicating a certain temperature or flow rate of the water, and temperature indicating means having its temperature sensitive means disposed in the parts of the assembly carrying the mixed stream of water.

2. The valve assembly of claim 1, in which both the conduit means for the water of higher and the water of lower temperature are provided with said rotary stem-type needle valves and with said index indicia.

3. The valve assembly of claim 1, comprising in addition valve means for controlling the flow rate of the outgoing mixed stream of water independently of the setting of said primary needle valves.

4. The valve assembly of claim 1, in which the said index is of the circular type fixedly provided on a support around said stem of said valve, and pointer means coupled to the rotary stem sweeping along said index of indicia upon rotation of said stem.

5. The valve assembly of claim 1, wherein at least one of the conduits for the incoming water is provided with a bypass conduit comprising an additional fine adjustment needle valve for varying the flow rate of at least one of the incoming streams of water without a needle for changing the setting of said primary needle valve contained in the coordinated conduit means for the incoming water.

6. A method for producing a stream of water having an exact predetermined temperature, which method comprises the step of finely metering separate streams of hot and cold water, the step of mixing the metered streams of hot and cold water, said metering being effected in a ratio to produce upon mixing about the desired temperature, the step of determining the temperature achieved in the outgoing stream of mixed water, the step of changing the flow rate of at least one of the streams by an arbitrary relative amount, the step of determining the temperature change brought about by said relative flow rate change in the outgoing stream of mixed water, and the step of changing the flow rate of said changed stream by a relative amount calculated from said relative flow rate change and temperature change caused thereby to produce exactly the desired temperature of the outgoing stream of mixed water.